(12) United States Patent
Delaney et al.

(10) Patent No.: US 12,470,517 B1
(45) Date of Patent: *Nov. 11, 2025

(54) SYSTEMS AND METHODS FOR COMMUNICATING BETWEEN PRIVATE NETWORKS WITH CONFLICTING INTERNET PROTOCOL (IP) ADDRESSES

(71) Applicant: Dispel, LLC, New York, NY (US)

(72) Inventors: Christopher Edward Delaney, Front Royal, VA (US); Chava Louis Jurado, Chantilly, VA (US); Carl Bailey Jacobs, Fredericksburg, VA (US)

(73) Assignee: Dispel, LLC, Austin, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/349,378

(22) Filed: Jul. 10, 2023

Related U.S. Application Data

(63) Continuation of application No. 17/519,018, filed on Nov. 4, 2021, now Pat. No. 11,729,138, which is a continuation of application No. 16/720,116, filed on Dec. 19, 2019, now Pat. No. 11,178,100.

(60) Provisional application No. 62/785,755, filed on Dec. 28, 2018.

(51) Int. Cl.
| | |
|---|---|
| *H04L 61/5007* | (2022.01) |
| *H04L 12/46* | (2006.01) |
| *H04L 61/2503* | (2022.01) |
| *H04L 61/4511* | (2022.01) |

(52) U.S. Cl.
CPC ...... *H04L 61/5007* (2022.05); *H04L 12/4641* (2013.01); *H04L 61/2503* (2013.01); *H04L 61/4511* (2022.05)

(58) Field of Classification Search
CPC ............ H04L 61/5007; H04L 61/2503; H04L 61/4511; H04L 12/4641
See application file for complete search history.

(56) References Cited

U.S. PATENT DOCUMENTS

| | | | |
|---|---|---|---|
| 10,505,893 B1 | 12/2019 | Griggs et al. | |
| 2002/0193116 A1 | 12/2002 | Agrawal et al. | |
| 2003/0014706 A1 | 1/2003 | Poeluev | |
| 2006/0251088 A1* | 11/2006 | Thubert | H04L 12/2898 370/352 |

(Continued)

FOREIGN PATENT DOCUMENTS

| | | |
|---|---|---|
| CN | 101964799 A | 2/2011 |

*Primary Examiner* — Kenny S Lin
(74) *Attorney, Agent, or Firm* — Jones Day

(57) ABSTRACT

Systems and methods for facilitating communication between multiple private networks with conflicting IP addresses are provided. The system comprises a virtual computing device configured to allocate blocks of shadow IP addresses to first and second private networks. A first bridge device is connected to the first private network and configured to receive a packet from a first host in the first private network. The packet comprises a destination address corresponding to a second host in the second private network. The first bridge device is configured to route the packet to the virtual computing device if the destination address is in a block of shadow IP addresses. A second bridge device is connected to the second private network and configured to receive the packet from the virtual computing device and translate the destination address to a corresponding native IP address.

19 Claims, 18 Drawing Sheets

(56) References Cited

U.S. PATENT DOCUMENTS

| | | |
|---|---|---|
| 2007/0195800 A1 | 8/2007 | Yang et al. |
| 2012/0078609 A1 | 3/2012 | Chaturvedi et al. |
| 2013/0198065 A1 | 8/2013 | McPherson et al. |
| 2015/0134853 A1 | 5/2015 | Verwoerd |
| 2015/0207773 A1 | 7/2015 | Matsen |
| 2019/0036871 A1 | 1/2019 | Lapidous et al. |

* cited by examiner

SYSTEMS AND METHODS FOR COMMUNICATING BETWEEN PRIVATE NETWORKS WITH CONFLICTING INTERNET PROTOCOL (IP) ADDRESSES

CROSS-REFERENCE TO RELATED APPLICATIONS

This application is a continuation application of U.S. patent application Ser. No. 17/519,018, filed Nov. 4, 2021, which is a continuation application of U.S. patent application Ser. No. 16/720,116, filed Dec. 19, 2019, which claims priority to U.S. Provisional Application No. 62/785,755, filed Dec. 28, 2018, all of which are incorporated herein by reference in their entireties.

TECHNICAL FIELD

The technology described herein relates generally to computer networking and more particularly to communications between private networks.

BACKGROUND

Various organizations operate computer networks as part of their day-to-day business functions. Each of these networks, whether a Local Area Network (LAN), a Wide Area Network (WAN), or other network type, comprises one or more machines making use of blocks of Internet Protocol (IP) addresses. Many, if not most, such networks make use of what are called Internet Assigned Numbers Authority (IANA)-reserved address blocks of IP addresses for internal operations. These IANA-reserved IP addresses cannot be routed across the public Internet.

In general, IP addresses across the Internet are assumed (and in fact required) to be unique, to allow traffic to be routed from one specific host to another. However, because the IANA-reserved blocks of IP addresses (e.g., 192.168.0.0/16, 172.16.0.0/12, and 10.0.0.0/8) are reserved for private use and do not require registration with any central organization, it is inevitable that organizations might independently choose the same reserved block of IP addresses to use internally.

Having conflicting internal IP addresses is problematic in at least two scenarios. The first scenario occurs when a machine with an IANA-reserved address communicates across the Internet. The second scenario occurs when, for business reasons (e.g. a merger or acquisition between companies), two or more networks that have been configured to use the same IANA-reserved IP address blocks communicate with one another.

The first scenario (a machine with an IANA-reserved address communicating with the internet) is already addressed through Network Address Translation (NAT) technology. But NAT is limited in scope and primarily intended for communications that originate on the private reserved network and terminate on the public internet. NAT makes no provision for simple network communications between two IANA-reserved IP networks in the second scenario. Facilitating private communications between these IANA-reserved IP networks is also outside of the scope of NAT.

SUMMARY

A system for facilitating communication between multiple private networks with conflicting internet protocol (IP) addresses is provided herein. The system comprises a virtual computing device in an on-demand network configured to allocate a first block of shadow IP addresses for a first block of native IP addresses that correspond to first hosts in a first private network and a second block of shadow IP addresses for a second block of native IP addresses that correspond to second hosts in a second private network. The first block of native IP addresses conflict with the second block of native IP addresses. The system further comprises a first bridge device connected to the first private network and configured to receive a packet from a first host in the first private network, the packet comprising a destination address corresponding to a host in the second private network, and route the packet to the virtual computing device if the destination address is in the second block of shadow IP addresses. The system further comprises a second bridge device connected to the second private network and configured to receive the packet from the virtual computing device, translate the destination address to a corresponding native IP address, and send the packet to the host with the corresponding native IP address.

A method for facilitating communication between multiple private networks is provided herein. In the method, a domain name service (DNS) request is intercepted from a first network. The DNS request comprises a domain name and a host name. If the domain name corresponds to a second network, the DNS request is redirected to a private domain name server in the second network. A local IP address corresponding to the host name is received from the private domain name server. If a mode comprises native mode or shadow mode is determined. The DNS request is responded to with the shadow IP address or the local IP address based on the mode.

A method for facilitating communication between multiple private networks with conflicting internet protocol (IP) addresses is provided herein. In the method, a first block of shadow IP addresses is allocated to a first network and a second block of shadow IP addresses is allocated to a second network. A packet is intercepted from a first network. The packet comprises a destination IP address, and the destination IP address comprises a shadow IP address in the second block of shadow IP addresses. Whether the destination IP address appears in the second block of shadow IP addresses claimed by a second network is determined. Based on the determining, a mapping rule is applied to the packet, such that the destination IP address is modified to an actual native IP address that corresponds to the shadow IP address. The packet is sent to the second network.

DETAILED DESCRIPTION

Systems and methods for facilitating communications between two or more private networks that share conflicting IP address spaces are described herein. The systems and methods automatically translate, or shadow, IP addresses on a one-to-one basis. Transparent Domain Name Service (DNS) is integrated with the shadowed network through packet capture and redirection. In these systems and methods, the communications between the two or more private networks are not discoverable by a third party.

Typically, network packet routing paths are determined at devices that choose the direction and network pathway a packet must traverse based on various rules that are established in advance and then followed. These rules are based upon and imply a relatively static network topology, such that traffic to a particular destination today will follow more or less the same path as traffic to the particular destination historically, unless a router is configured to choose a different path.

With the advent of software-defined networks (SDNs) generally, and on-demand computing network environments specifically, network topologies can change on a daily or an hourly basis, such that static routing of traffic becomes inefficient and/or ineffective. For examples of such on-demand computing networks, see U.S. Pat. Nos. 9,935,850 and 9,954,918, the entirety of which are incorporated by reference.

Rather than having a set of central rules for routing traffic, the systems and methods described herein employ a network exit point (e.g., a perimeter router) to claim IP addresses, either individually, or in blocks. The exit point may direct an upstream router to send all traffic for those IP addresses to it for further routing. By using a destination router, rather than an upstream router, to determine IP packet routing, traffic can be handed off from router to router with no intervention by upstream users, services, or machines.

Figure 1:
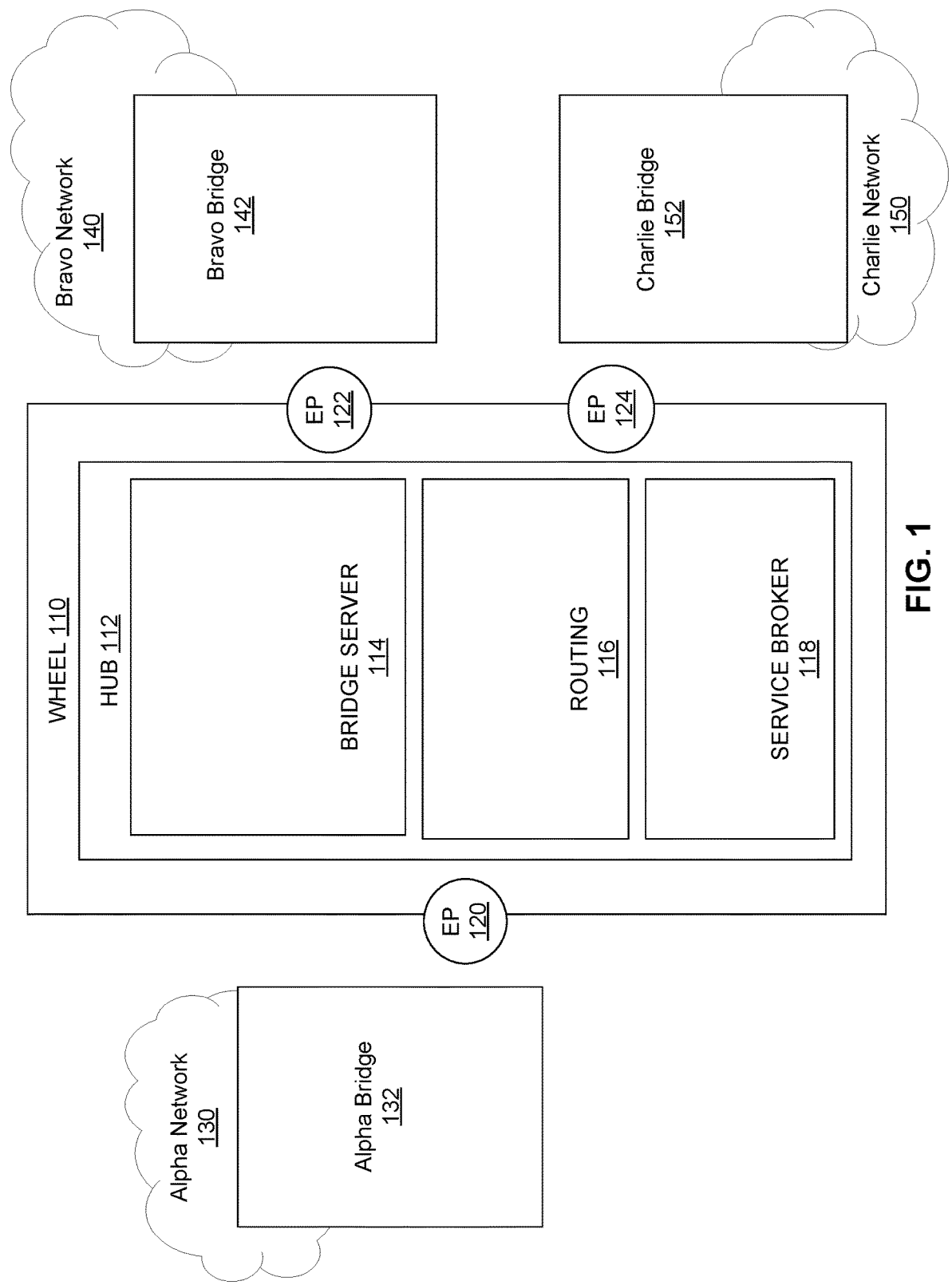
FIG. 1 is a diagram that depicts an exemplary system that facilitates communications between multiple private networks.

FIG. 1 is a diagram that depicts an exemplary system 100 that facilitates communications between multiple private networks. In this exemplary system 100, Alpha Acquisition Corp has purchased two companies: Bravo Widget Company LLC, and Charlie Integrators, Inc. The multiple private networks include an Alpha network 130, a Bravo network 140, and a Charlie network 150. The Alpha network 130 uses IP addresses in the 172.16.x.x range, and the Bravo network 140 and the Charlie network 150 use IP addresses in the 192.168.1.x range. Seamless communication between the three networks is desired, but it would be cost- and labor-prohibitive to modify the Bravo network 140 or the Charlie network 150 to use different IP addresses. Because the Bravo and Charlie networks use the same IP address space, it is difficult to route traffic between them using traditional network routing policies. Traditional DNS will fail, for example, if both mailserver.bravo.com and filestore.charlie.com have the IP address 192.168.1.25. If a user in the Charlie network 150 were to try to send an email using mailserver.bravo.com, the traffic would instead reach (over the local network) filestore.charlie.com.

Instead of using traditional network routing policies, the exemplary system 100 allows the multiple private networks to communicate with each other through an on-demand computing network environment comprising a wheel 110 and a hub 112. The wheel 110 comprises entry points 120, 122, and 124, and the hub 112 comprises a bridge server 114, a routing module 116, and a service broker 118.

The wheel 110 is instantiated by a network implementation engine. The wheel 110 comprises one entry point for each LAN, WAN, or other network that will be connected using this system. In this example, entry point 120 is used by the Alpha network 130, entry point 122 is used by the Bravo network 140, and entry point 124 is used by the Charlie network 150.

Each of the private networks 130, 140, and 150 comprise a bridge device 132, 142, or 152, respectively. The bridge devices 132, 142, and 152 are installed on each organizational network that is to be bridged together, in between the network and the Internet, in a manner similar to any other edge device, like a firewall or perimeter router. The bridge device 132, 142, or 152 can be implemented with, e.g., a Raspberry Pi or another machine running Linux, as long as the bridge device 132, 142, or 152 has at least two separate network interfaces.

Each bridge device 132, 142, and 152 is configured with the following information: (1) an IP address of the network implementation engine; (2) unique credentials with which to connect to the network implementation engine; (3) a domain name that is unique among the networks that are configured to use the wheel 110; (4) a list of IP address blocks associated with the network upon which the bridge is installed; and (5) a Boolean value for each configured network block, indicating whether the bridge is to present shadowed (false) IP addresses for that network block, or present those IP addresses directly. (If none of the private networks use conflicting IP address spaces, then IP shadowing is not employed; if two or more of the private networks are configured with conflicting IP address spaces, then the bridges for all such networks are configured to shadow their IP addresses for each of those blocks.)

Figure 2:
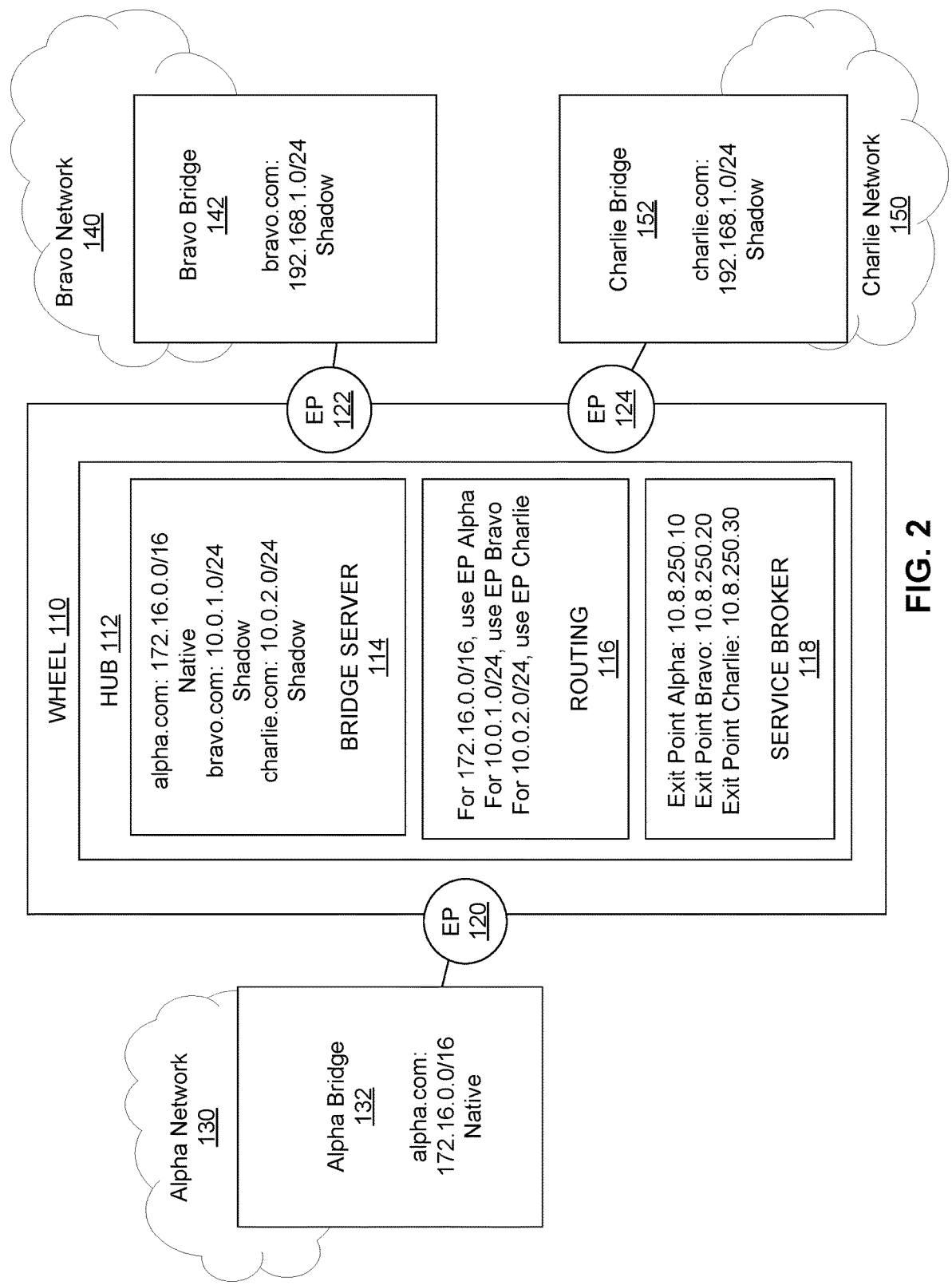
FIG. 2 is a diagram depicting operations of the exemplary system.

FIG. 2 is a diagram depicting operations of the exemplary network 100. In accordance with the above, the bridge devices are configured as follows. The Alpha bridge 132 is configured with the domain name of "alpha.com", the IP block of 172.16.0.0/16, and a mode of native. The Alpha bridge 132 is installed at the perimeter of the Alpha network 130. The Bravo bridge 142 is configured with the domain name of "bravo.com", the IP block of 192.168.1.0/24, and a mode of shadow. The Bravo bridge 142 is installed at the perimeter of the Bravo network 140. The Charlie bridge 152 is configured with the domain name of "charlie.com", the IP block of 192.168.1.0/24, and a mode of shadow. The Charlie bridge 152 is installed at the perimeter of the Charlie network 150.

The wheel 110 and entry points 120, 122, and 124 are established and in operation. Each of the bridge devices 132, 142, and 152 connects to the network implementation engine, presents its pre-configured unique credentials, and receives the IP address of its corresponding entry point, and an access token that will allow the connection. Each time the bridge device 132, 142, or 152 connects to the on-demand network, the bridge device 132, 142, or 152 receives entry point and access tokens from the network implementation engine. In this way, bridging can be moved from an old wheel to a new wheel by shutting down the old wheel, starting up the new wheel, and configuring the engine to tell all of the bridges from the old wheel to connect to the new wheel instead.

Upon starting up, each of the bridge devices 132, 142, and 152 establishes a connection to the bridge server 114 and presents the following information: (1) a unique domain name; (2) a list of IP address blocks associated with the private network; (3) a Boolean value indicating shadowed or native IP addresses; and (4) a wheel IP address that was given to the bridge device when it connected to the on-demand network.

Upon receiving the information from each of the bridge devices 132, 142, and 152, the bridge server 114 stores each of the unique domain names in a table of connected domains in a database. If an IP address block presented by one of the bridge devices 132, 142, or 152 is to be shadowed, based on the Boolean value, the bridge server 114 allocates and stores a "unique to this server" block of IP addresses and generates an association between the "unique to this server" block of IP addresses and the unique domain name. If an IP address block presented by one of the bridge devices 132, 142, or 152 is not to be shadowed, based on the Boolean value, the bridge server 114 allocates and stores the native IP block and generates an association between the native IP block and the unique domain name.

When the Alpha bridge 132 starts up, it establishes a Virtual Private Network (VPN) connection to the wheel 110 via the IP address of the entry point 120. The Alpha bridge 132 registers itself with the bridge server 114, specifying "alpha.com", "172.16.0.0/16", and native mode. The bridge server 114 stores the unique domain name of alpha.com for the Alpha bridge 132 in the table of connected domains in the database. The bridge server 114 allocates the 172.16.0.0/16 block of IP addresses because the Boolean value sent by the Alpha bridge 132 indicated native mode. The bridge server 114 also generates an association between alpha.com and the 172.16.0.0/16 block of IP addresses.

When the Bravo bridge 142 starts up, it establishes a Virtual Private Network (VPN) connection to the wheel 110 via the IP address of the entry point 130. The Bravo bridge 142 registers itself with the bridge server 114, specifying "bravo.com", "192.168.1.0/24", and shadow mode. The bridge server 114 stores the unique domain name of bravo.com for the Bravo bridge 142 in the table of connected domains in the database. The bridge server 114 allocates a shadow IP block (10.0.1.0/24) for the Bravo bridge 142 because the Boolean value sent by the Bravo bridge 142 indicated shadow mode. The bridge server 114 also generates an association between bravo.com and the 10.0.1.0/24 block of IP addresses.

When the Charlie bridge 152 starts up it establishes a Virtual Private Network (VPN) connection to the wheel 110 via the IP address of the entry point 140. The Charlie bridge 152 registers itself with the bridge server 114, specifying "charlie.com", "192.168.1.0/24", and shadow mode. The bridge server 114 stores the unique domain name of charlie.com for the Charlie bridge 152 in the table of connected domains in the database. The bridge server 114 allocates a shadow IP block (10.0.2.0/24) for the Charlie bridge 152 because the Boolean value sent by the Charlie bridge 152 indicated shadow mode. The bridge server 114 also generates an association between charlie.com and the 10.0.2.0/24 block of IP addresses.

Each of the bridge devices 132, 142, and 152 presents itself as an exit point to the service broker 118 running on the wheel 110. For example, IP address 10.8.250.10 is used for the exit point for the Alpha bridge 132, IP address 10.8.250.20 is used for the exit point for the Bravo bridge 142, and IP address 10.8.250.30 is used for the exit point for the Charlie bridge 152. The service broker 118 may take the form of a service broker as described in U.S. patent application Ser. No. 15/346,859, which is herein incorporated by reference.

For each IP block, the bridge server 114 executes a routing command on the routing module 116 that directs all network traffic destined for the IP block (shadowed, if applicable, or native) to be routed to the exit point established by the associated bridge device 132, 142, or 152. The bridge server 114 establishes rules on the routing module 116 indicating that, thereafter, all traffic destined for the 172.16.0.0/16 network should be directed to use the exit point established by the Alpha bridge 132, i.e., 10.8.250.10. The bridge server 114 establishes rules on the routing module 116 indicating that, thereafter, all traffic destined for the 10.0.1.0/24 network should be directed to the exit point established by the Bravo bridge 142, i.e., 10.8.250.20. Because the Charlie bridge 152 is in shadow mode, the bridge server 114 establishes rules on the routing module 116 indicating that, thereafter, all traffic destined for the 10.0.2.0/24 network should be directed to the exit point established by the Charlie bridge 152, i.e., 10.8.250.30.

The bridge server 114 responds to each of the bridge devices 132, 142, or 152 indicating success in performing the allocation, storing, and routing operations, and (if applicable) the list of shadowed IP blocks allocated for that bridge device. For example, the bridge server 114 responds to Alpha bridge 132 indicating success, but since there are no shadowed IP blocks allocated for the Alpha bridge 132, the bridge server 114 does not send the same to the Alpha bridge 132. The bridge server 114 responds to the Bravo bridge 142 indicating success, along with the shadowed block of IP addresses, i.e., 10.0.1.0/24, for the native IP addresses, i.e., 192.168.1.0/24, of the Bravo bridge 142. The bridge server 114 responds to the Charlie bridge 152 indicating success, along with the shadowed block of IP addresses, i.e., 10.0.2.0/24, for the native IP addresses, i.e., 192.168.1.0/24, of the Charlie bridge 152.

Figure 3:
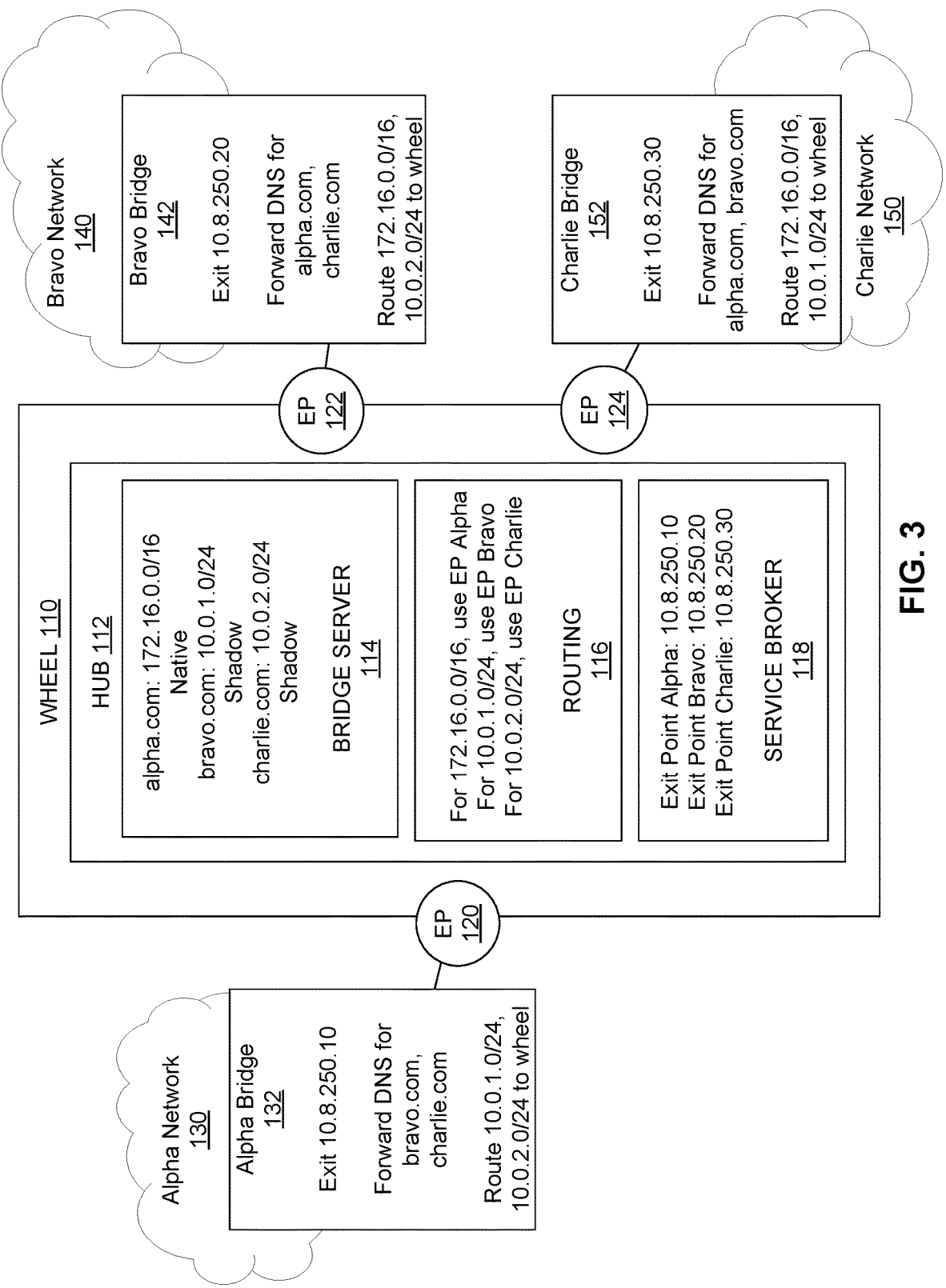
FIG. 3 depicts the exemplary system and indicates additional operations performed by bridge devices and a bridge server.

FIG. 3 depicts the system 100 of FIG. 1 and indicates additional operations performed by each of the bridge devices 132, 142, and 152 and the bridge server 114. Each of the bridge devices 132, 142, and 152 periodically sends a request for a list of all connected networks comprising domain names and their associated IP Blocks that have registered with the bridge server 114. The bridge server 114 responds with the unique domain names and IP blocks that it has stored in its database, i.e., the shadowed blocks or native blocks, for every connected bridge device 132, 142, and 152 other than the one that is making the request (such that no bridge device 132, 142, and 152 will receive its own domain name and associated IP blocks in a response). Each of the bridge devices 132, 142, and 152 stores a list of all of the unique domain names it has received from the bridge server 114.

Upon requesting the list of connected networks and associated IP blocks, the Alpha bridge 132 knows that bravo.com is on IP block 10.0.1.0/24 and charlie.com is on IP block 10.0.2.0/24. The Bravo bridge 142 knows that alpha.com is on IP block 172.16.0.0/16 and charlie.com is on IP block 10.0.2.0/24. The Charlie bridge 152 knows that: alpha.com is on IP block 172.16.0.0/16 and bravo.com is on IP block 10.0.1.0/24.

For each of the IP blocks received from the bridge server 114, each of the bridge devices 132, 142, and 152 executes a routing command which directs all network traffic destined for the IP blocks to be routed across the VPN connection to the wheel 110. For example, the Alpha bridge 132 executes a routing command which directs all traffic destined for 10.0.1.0/24 (corresponding to Bravo bridge 142) and 10.0.2.0/24 (corresponding to Charlie bridge 152) to the wheel 110. The Bravo bridge 142 executes a routing command which directs all traffic destined for 172.16.0.0/16 (corresponding to Alpha bridge 132) and 10.0.2.0/24 (corresponding to Charlie bridge 152) to the wheel 110. The Charlie bridge 152 executes a routing command which directs all traffic destined for 172.16.0.0/16 (corresponding to Alpha bridge 132) and 10.0.1.0/24 (corresponding to Bravo bridge 142) to the wheel 110. At this point, computing devices on all three networks can communicate with each other.

Figure 4:
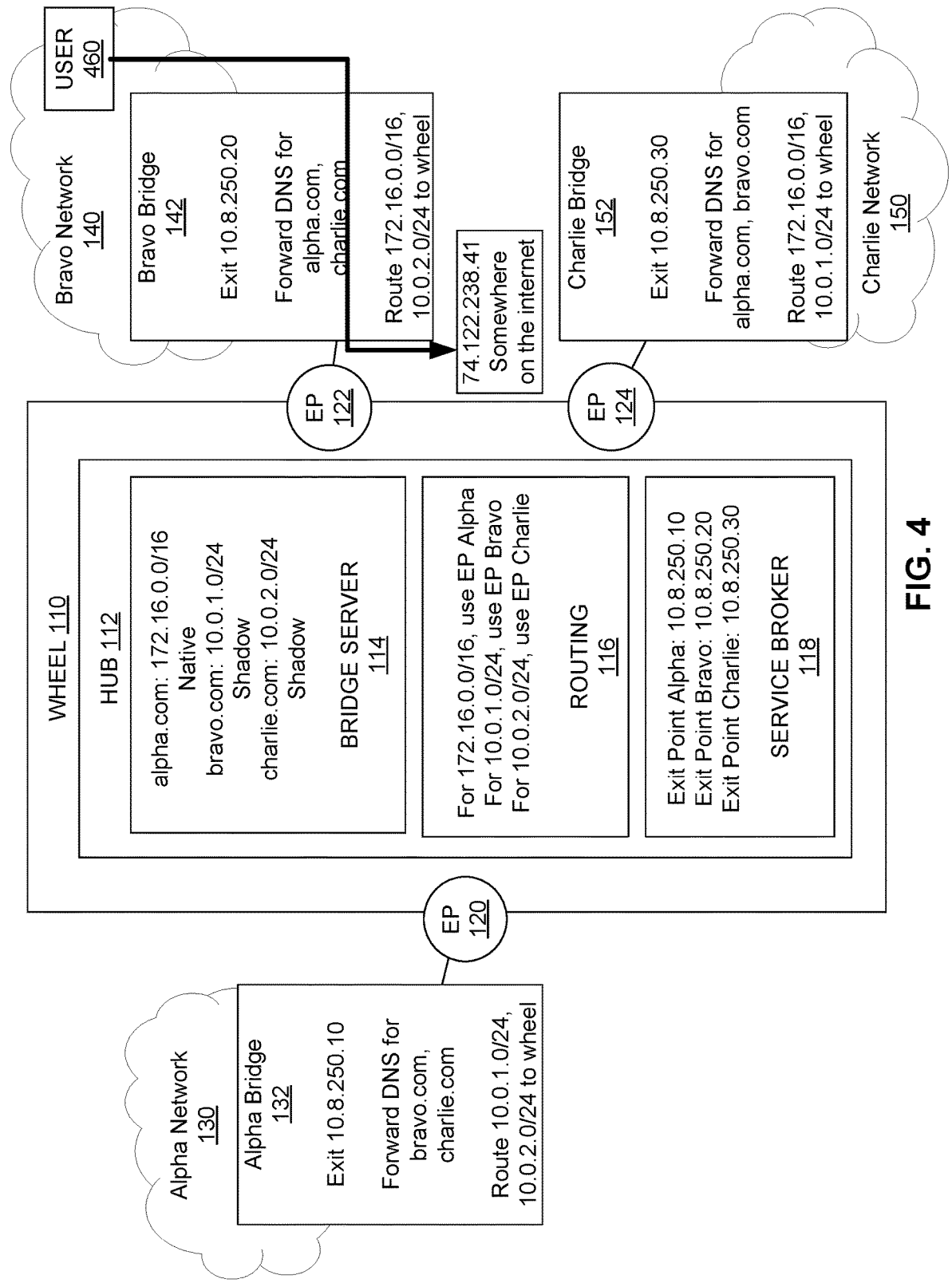
FIG. 4 depicts how the exemplary system processes traffic for a host with an IP address on the public Internet.

Because a bridge device is positioned between a private network and the public Internet, all traffic from the private network to any IP address that is not part of the private network, including DNS requests, will traverse the bridge device on its way from the private network to the public Internet. If the traffic is destined for an IP address that is not part of one of the IP blocks that the bridge device received from the bridge server, it will be allowed to pass unimpeded through the bridge because the traffic is for an IP address on the public Internet. This scenario is depicted in FIG. 4. A user 460 in the Bravo network 140 attempts to connect to IP address 74.122.238.41. The Bravo bridge 142 allows the traffic to pass unimpeded to the public Internet because the IP address is not part of the IP blocks that the Bravo bridge 142 received from the bridge server 114, i.e., it is not part of 172.16.0.0/16 or 10.0.2.0/24.

Figure 5:
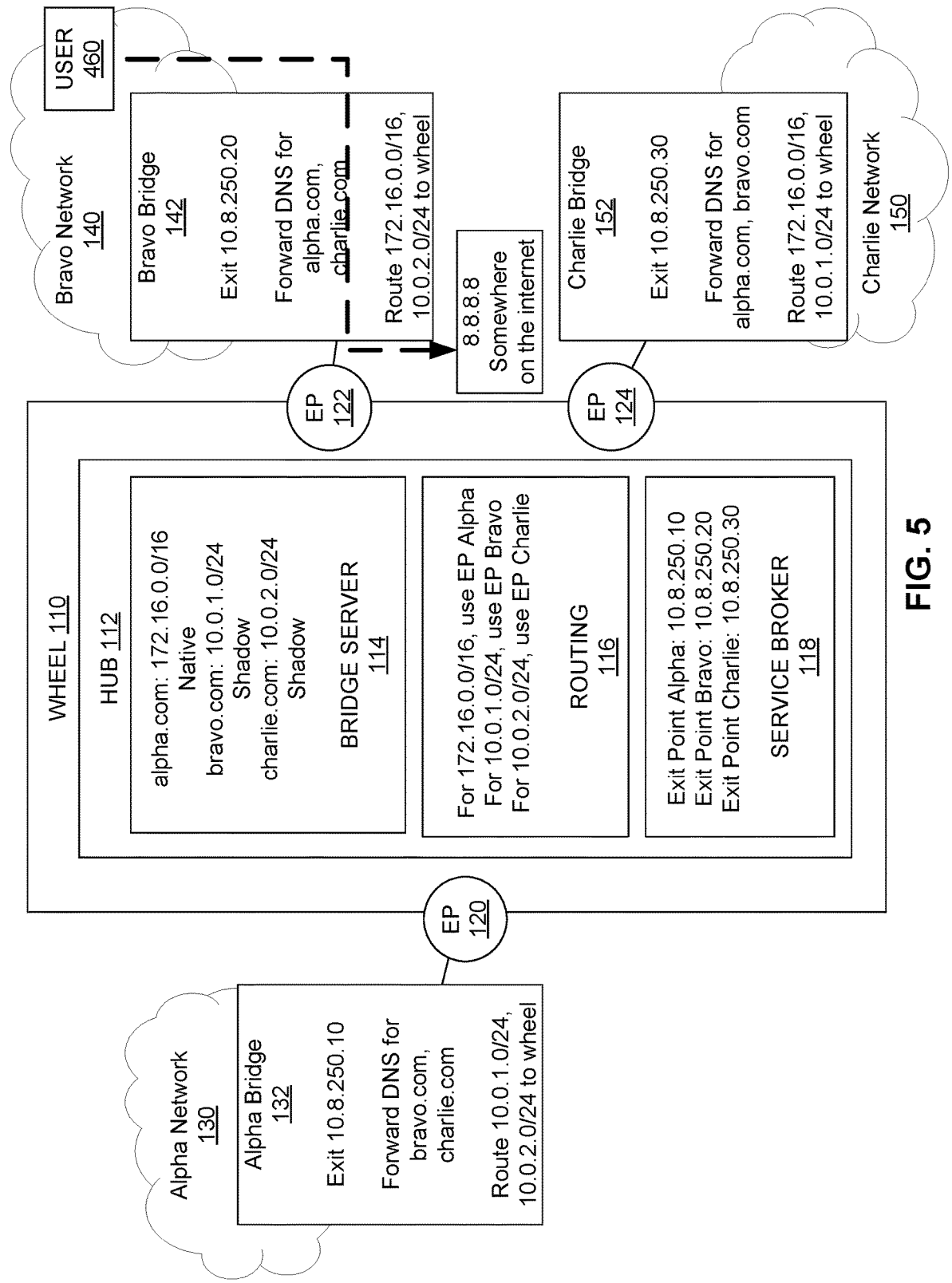
FIG. 5 depicts a scenario in which a user on a network sends a DNS request related to a host that is on one of the IP blocks used by another bridge device.

FIG. 5 depicts a scenario in which a user on a network sends traffic to a host that is on one of the IP blocks that a bridge device received from the bridge server 114. The user 460 in the Bravo network 140 attempts to view a file at filestore.charlie.com. A computer of the user 460 makes a DNS request to determine the IP address of filestore.charlie.com. In a traditionally configured network, a DNS server of the Bravo network 140 could be configured as the default public Google DNS server with IP address 8.8.8.8. The DNS request would be routed to leave the Bravo network 140 and hit the public internet. The dotted line indicates how the DNS request would be routed in a traditionally configured network.

Figure 6:
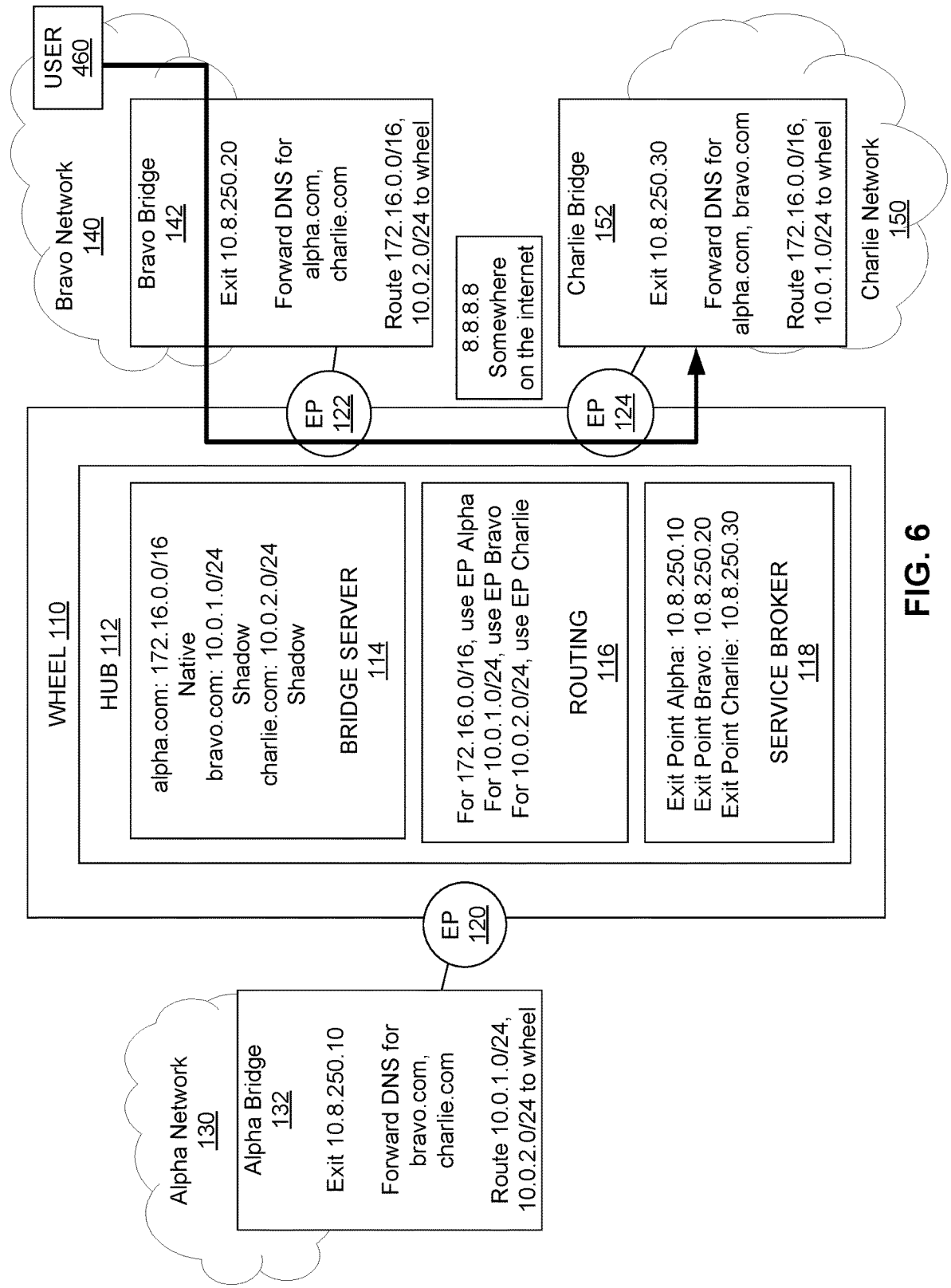
FIG. 6 depicts how the exemplary system handles DNS requests, specifically the DNS request from FIG. 5.

FIG. 6 depicts how the exemplary system 100 handles DNS requests, specifically the DNS request from FIG. 5. In general, if the traffic is a DNS request, an initiating bridge device intercepts and processes the DNS request in one of two ways. If the DNS request is for a host in a domain not listed in the list of all connected networks that was returned from the bridge server 114, it will be allowed to pass unimpeded through the initiating bridge device 132, 142, or 152 to a default nameserver the network is configured to use. If the DNS request is for a host with a domain that is listed in the list of all connected networks that was returned from the bridge server 114, the bridge device applies Destination Network Address Translation (DNAT) to change the destination address of the DNS request to the IP address of the bridge device 132, 142, or 152 that registered that domain name with the bridge server 114. The bridge device then routes the DNS request across the VPN connection to the wheel 110. Once the traffic reaches the hub 112, the hub 112 detects that the DNS request is intended for one of the IP blocks that has been claimed by another connected bridge device and routes the packet to that bridge device over the VPN.

Here, the DNS request is intercepted by the Bravo bridge 142. Because the DNS request is for a domain (charlie.com) that the Bravo bridge 142 knows is owned by the Charlie bridge 152, the Bravo bridge 142 applies DNAT to change the destination address of the DNS request from 8.8.8.8 to the IP address that Charlie bridge 152 that registered charlie.com with the bridge server 114, i.e., 10.8.250.30. The Bravo bridge 142 then routes the DNS request across the VPN connection to the wheel 110. Once the traffic reaches the hub 112, the hub 112 detects that the DNS request is intended for IP address 10.8.250.30, which corresponds to the exit point for Charlie bridge 152. The hub 112 routes the packet to the Charlie bridge 152 over the VPN.

When the DNS request reaches the receiving bridge device, it is handled in one of two ways. If the receiving bridge device is in native mode, it uses DNAT to redirect the DNS request to the IP address of the domain name server on its local network. If the receiving bridge device is in shadow mode, it initiates a request to the domain name server on the local network, asking for the IP address of the requested host. When the receiving bridge device receives a response from the domain name server on the local network, it maps the received IP address to the appropriate shadowed IP address and sends a response to the initiating bridge device containing the shadow IP address of the requested host.

Figure 7:
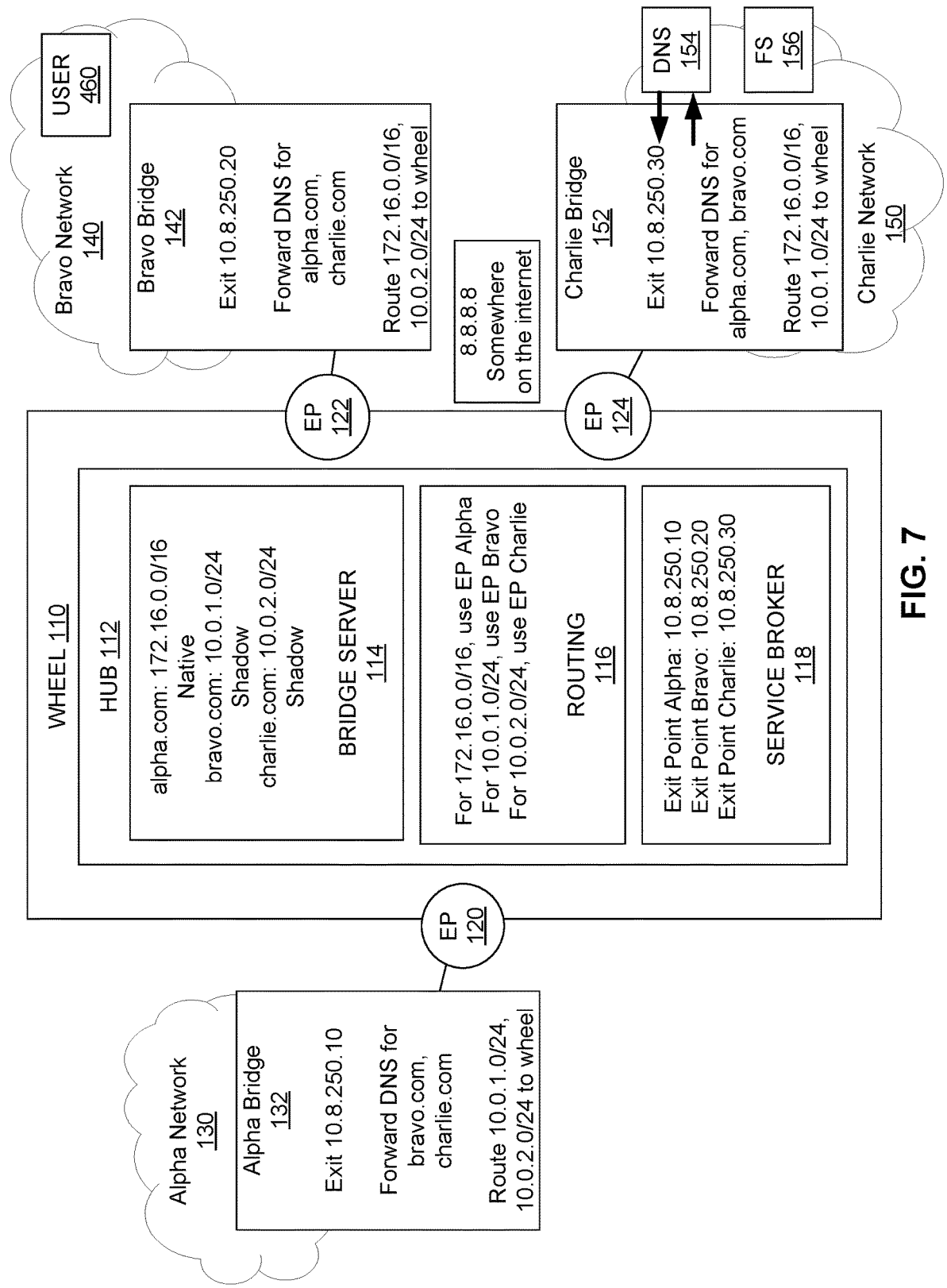
FIG. 7 depicts a receiving bridge device initiating a DNS request to a local DNS server.

Here, because the receiving bridge device, i.e., Charlie bridge 152, is in shadow mode, it initiates a DNS request to a Charlie DNS server 154 asking for the IP address of filestore.charlie.com, i.e., a Charlie filestore 156, as shown in FIG. 7. The Charlie DNS server 154 responds with the native IP address of filestore.charlie.com, i.e., 192.168.1.25. The Charlie bridge 152 replaces that IP address with the corresponding address from the shadow block it was issued by the bridge server, i.e., 10.0.2.25.

Figure 8:
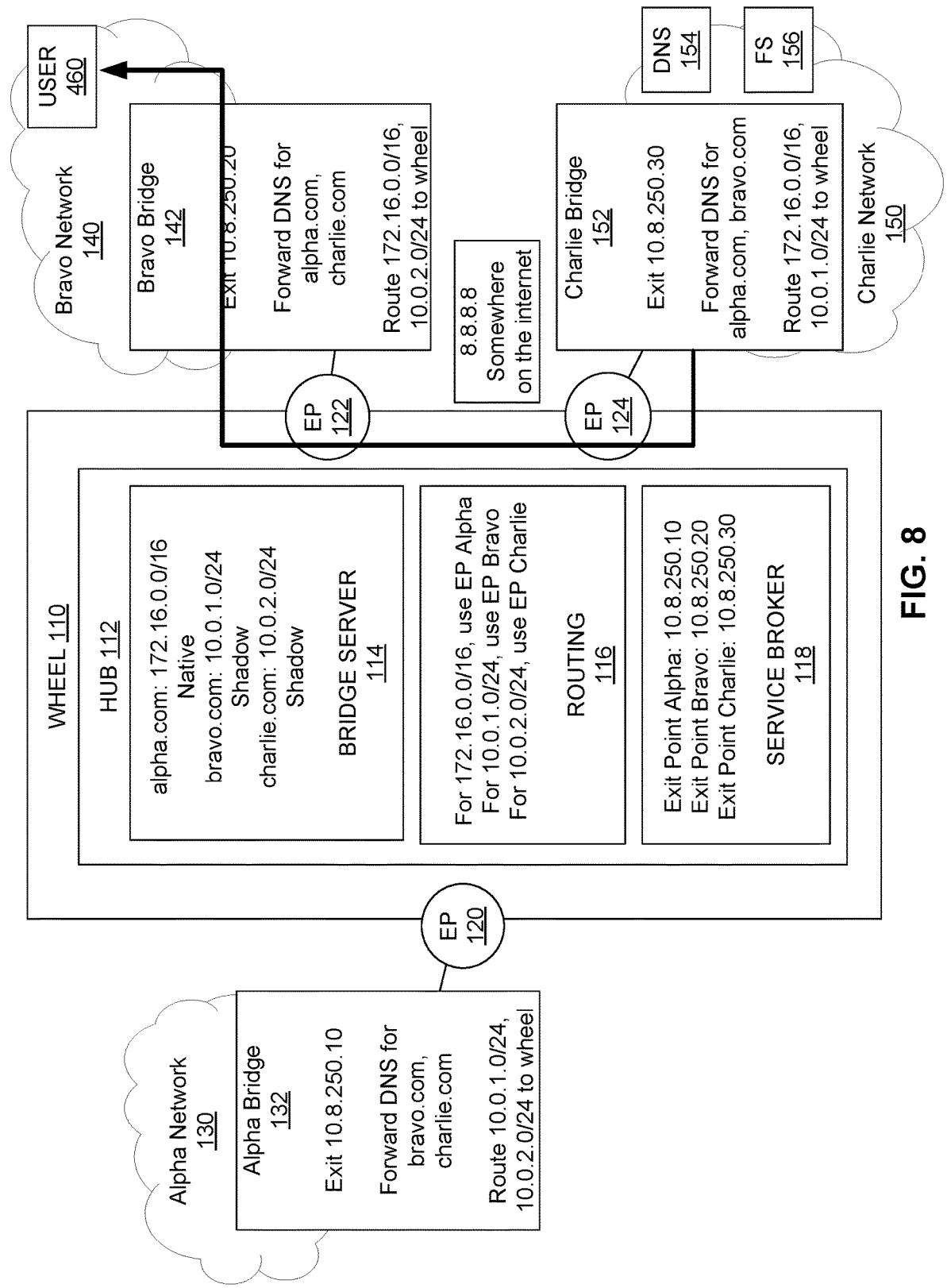
FIG. 8 depicts a receiving bridge device responding to a DNS request sent by an initiating bridge device.

The receiving bridge device responds to the DNS request from the initiating bridge device with the requested IP address. Here, the Charlie bridge 152 responds to Bravo bridge 142 to indicate that the IP address for filestore.charlie.com is 10.0.2.25, as depicted in FIG. 8. The DNS response reaches the computer of user 460 on the Bravo network 140.

Figure 9:
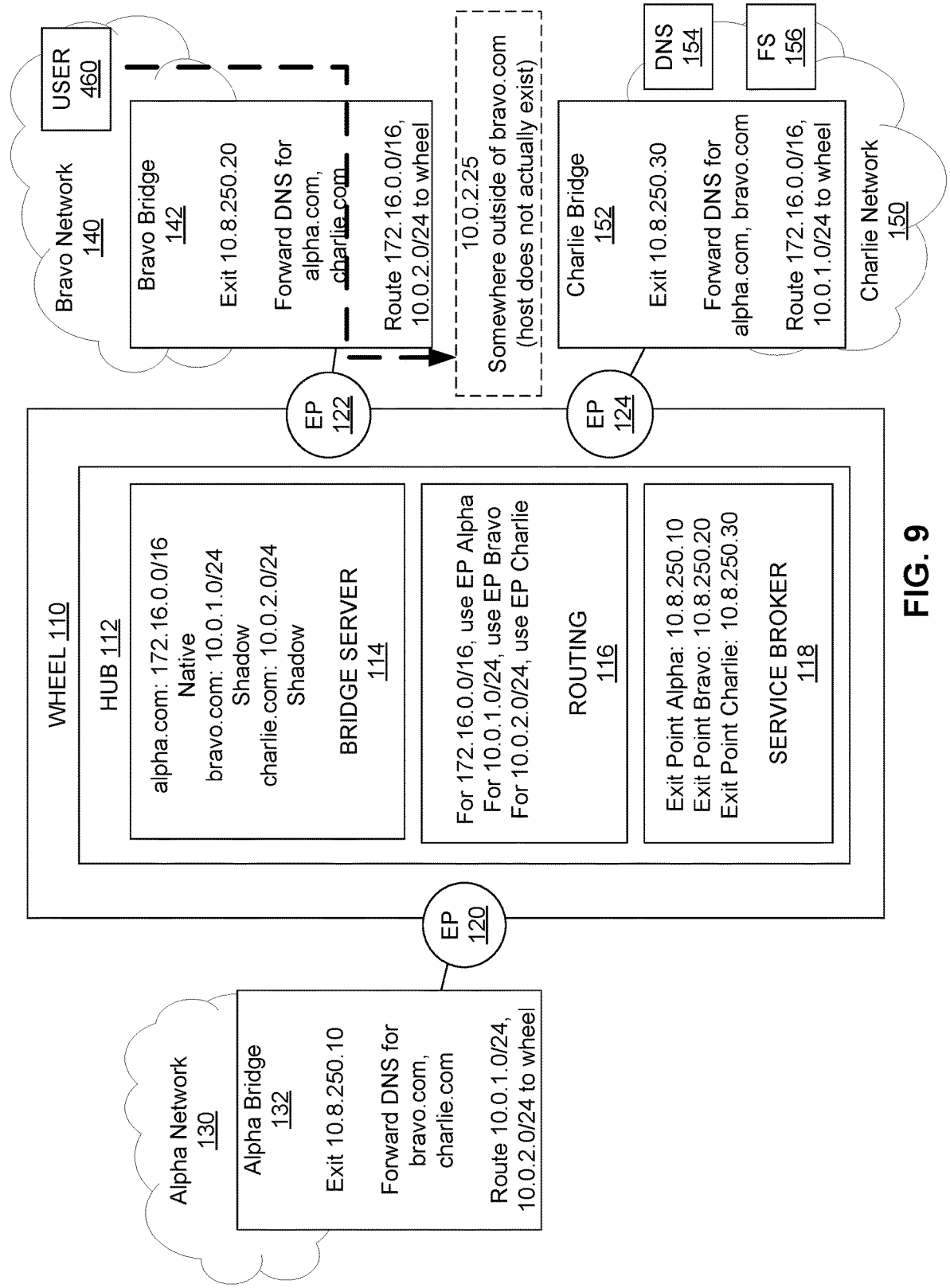
FIG. 9 depicts an originating host connecting to a destination host with an IP address received in a response to a DNS request.
Figure 10:
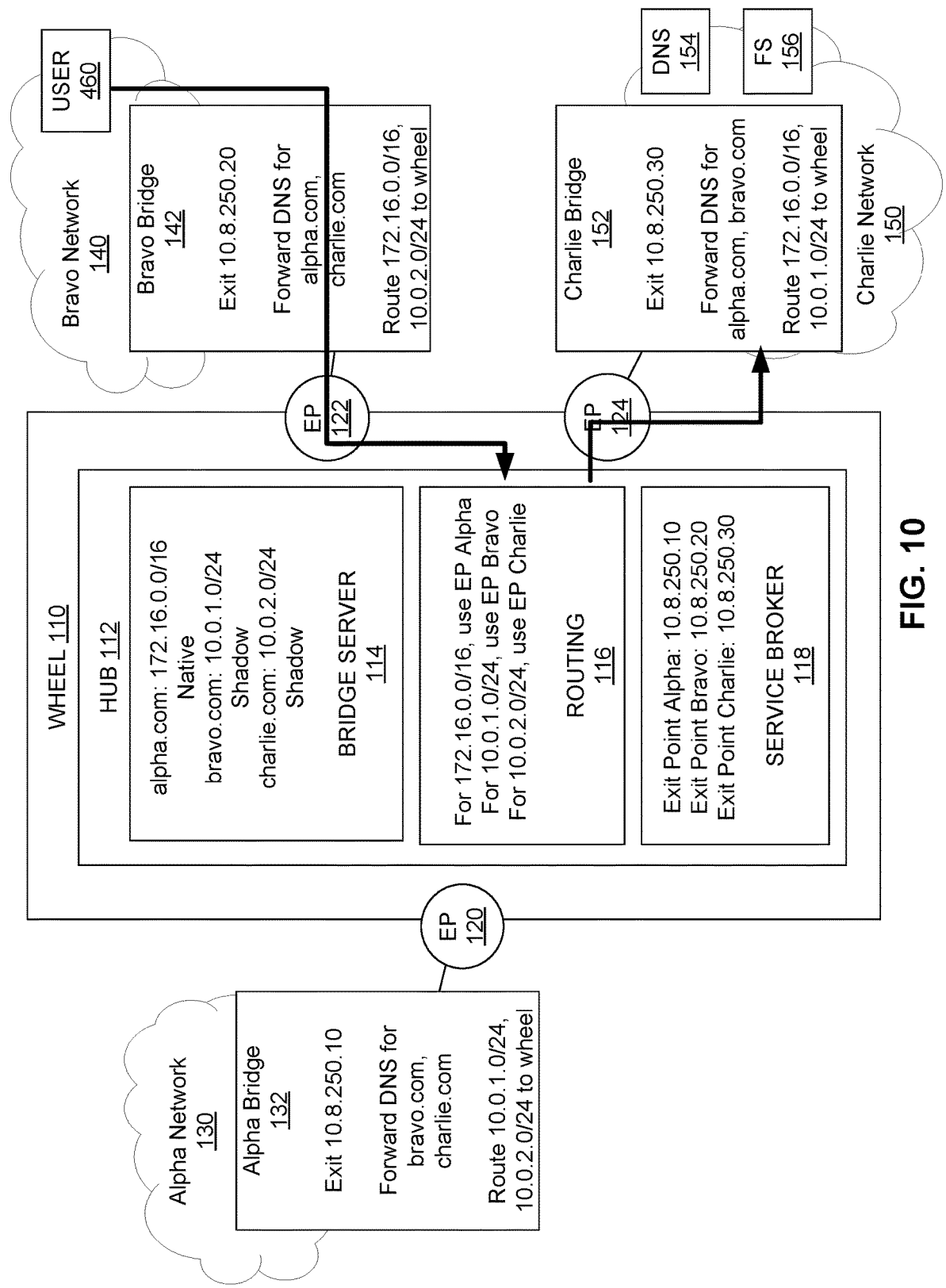
FIG. 10 depicts how the traffic is routed from the originating host to the destination host from FIG. 9.

After receiving a response to the DNS request, the originating host can connect to the requested IP address. Here, the computer of user 460 initiates a network connection to 10.0.2.25, as shown in FIG. 9. Because that IP address is not local to the Bravo network 140, traffic is sent to the default router, such that it traverses the Bravo bridge 142. The Bravo bridge 142 has routing rules in place that direct all 10.0.2.0/24 traffic to use the VPN to reach the hub 112, as shown in FIG. 10. Because the hub 112 has routing rules that provide that all 10.0.2.0/24 traffic is directed to the Charlie bridge 152 at 10.8.250.30, the hub 112 routes the connection to the Charlie bridge 152.

If in native mode, the receiving bridge device passes a packet directly to a connected network so that it will reach the host. If in shadow mode, the receiving bridge device applies a Network Mapping (NETMAP) rule to the traffic. The NETMAP rule changes a destination IP address of the packet from the shadowed address that accompanied the packet to an actual native address and then passes the packet on to the connected network so that it will reach the host. Here, the Charlie bridge 152 is in shadow mode, so it uses NETMAP to change the destination address of the connection from 10.0.2.25 to 192.168.1.25, and then passes the traffic on to the connected network so that it will reach the host. Alternatively, if in shadow mode, the receiving bridge device could apply a DNAT rule instead of a NETMAP rule. Thus, the user 460 is able to interact with the filestore.charlie.com server despite the fact that it has an IP address that conflicts with a server on the local Bravo network 140.

For packets going in the opposite direction from the receiving bridge device to the initiating bridge device, e.g., from Charlie bridge 152 to Bravo bridge 142 in the preceding examples, any de-shadowing of IP addresses is handled automatically by the network stack of the operating system of the bridge device.

Figure 11:
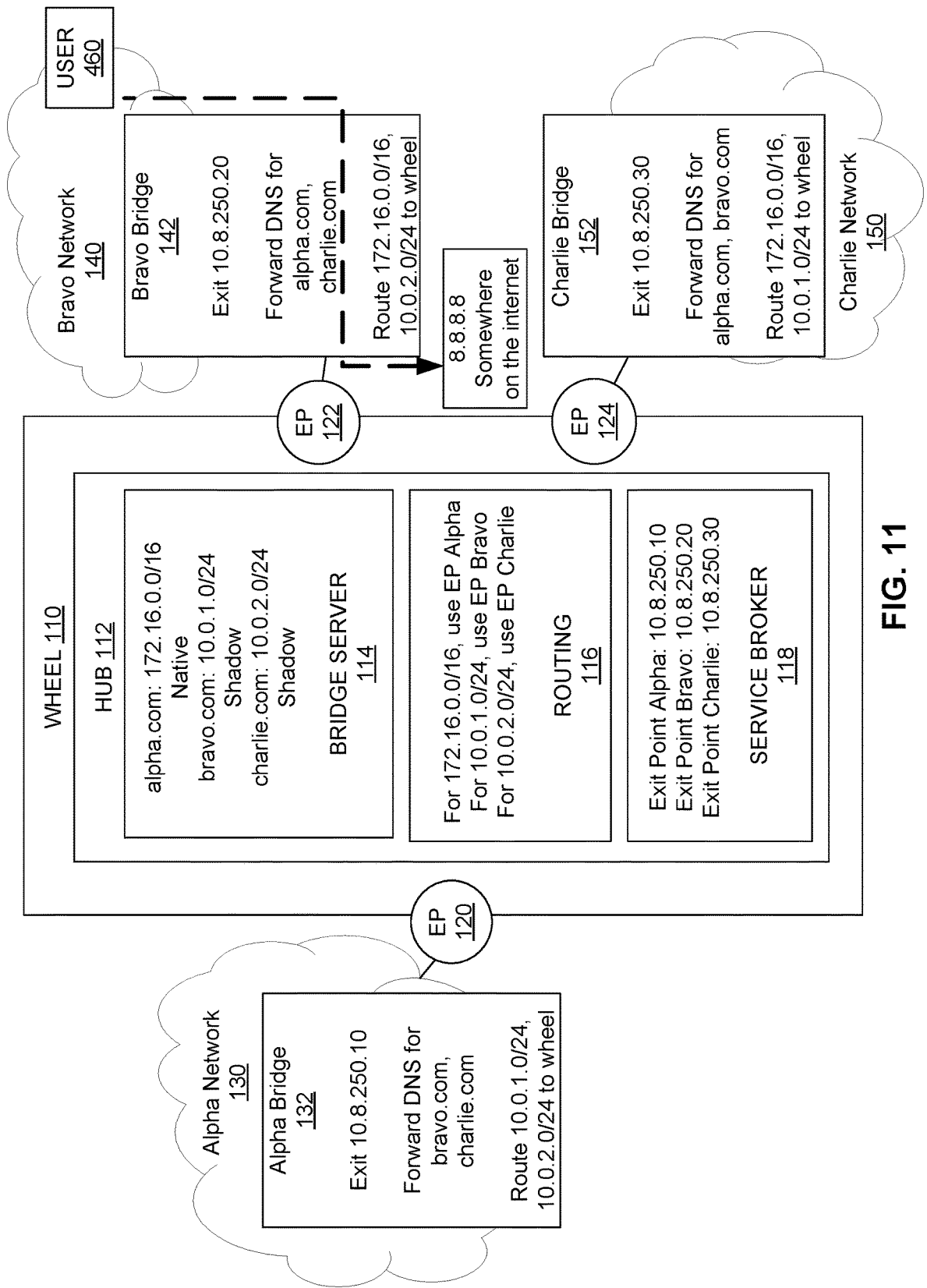
FIG. 11 depicts operations that occur when a user in a network with shadowed IP addresses attempts to connect to a host in a network with native IP addresses.

FIG. 11 depicts operations that occur when the user 460 in the Bravo network 140 wishes to view a file at filestore.alpha.com, i.e., Alpha filestore 134. The computer of user 460 makes a DNS request to determine the IP address of filestore.alpha.com. Because the default DNS server of the Bravo network 140 is set to the public Google DNS server with IP address 8.8.8.8, the DNS request is routed to leave the Bravo network 150 and reach the public Internet. The DNS request is intercepted by the Bravo bridge 142 on its way to the public Internet, such that it does not reach the public Internet, as indicated by the dotted line in FIG. 11. Because the DNS request is destined for a domain that the Bravo bridge 142 knows is owned by the Alpha bridge 132, i.e., alpha.com, the Bravo bridge 142 applies DNAT to change the destination address of the DNS request to 10.8.250.10.

Figure 12:
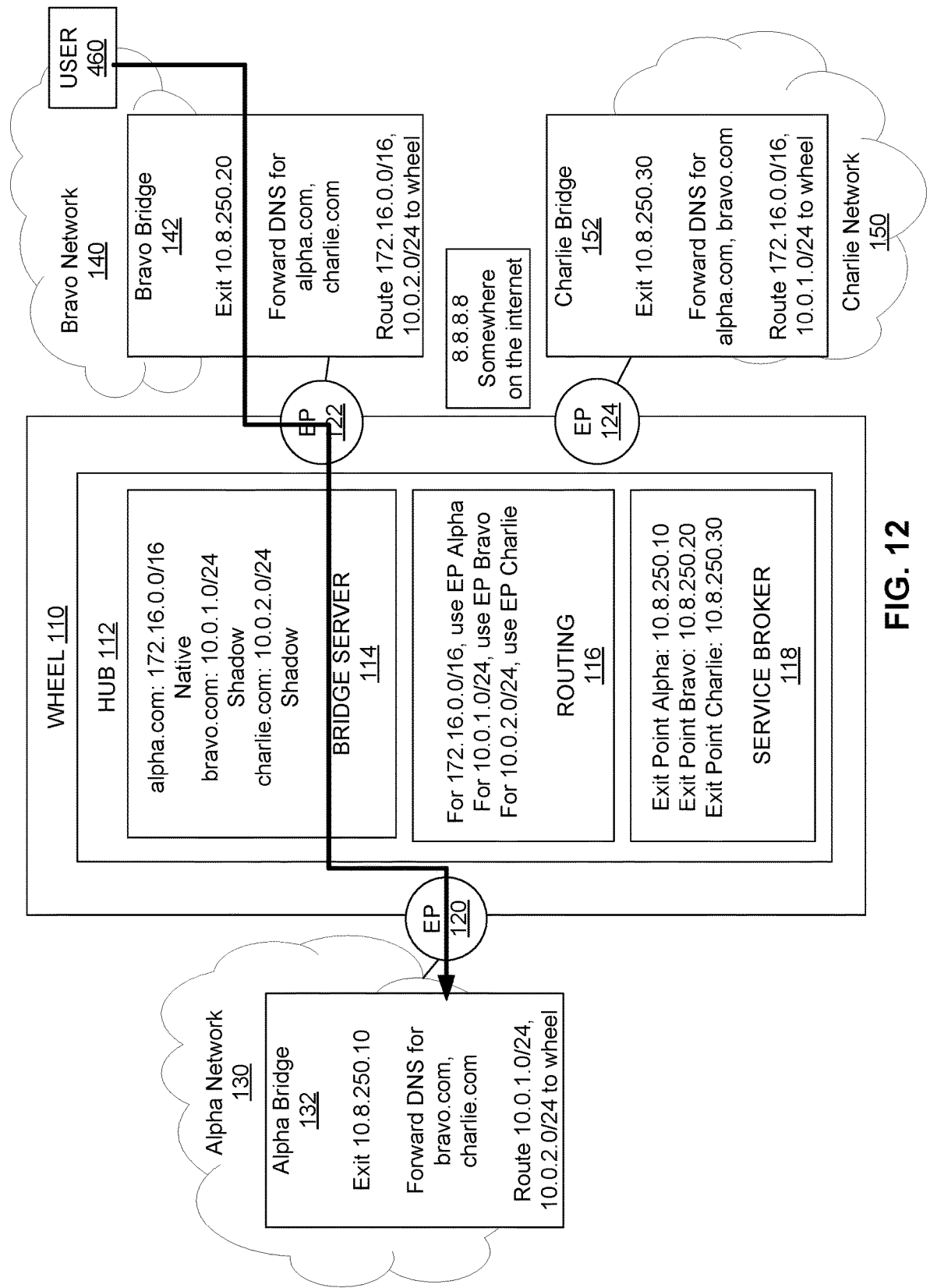
FIG. 12 depicts a DNS request for the IP address of the host in the network with native IP addresses.
Figure 13:
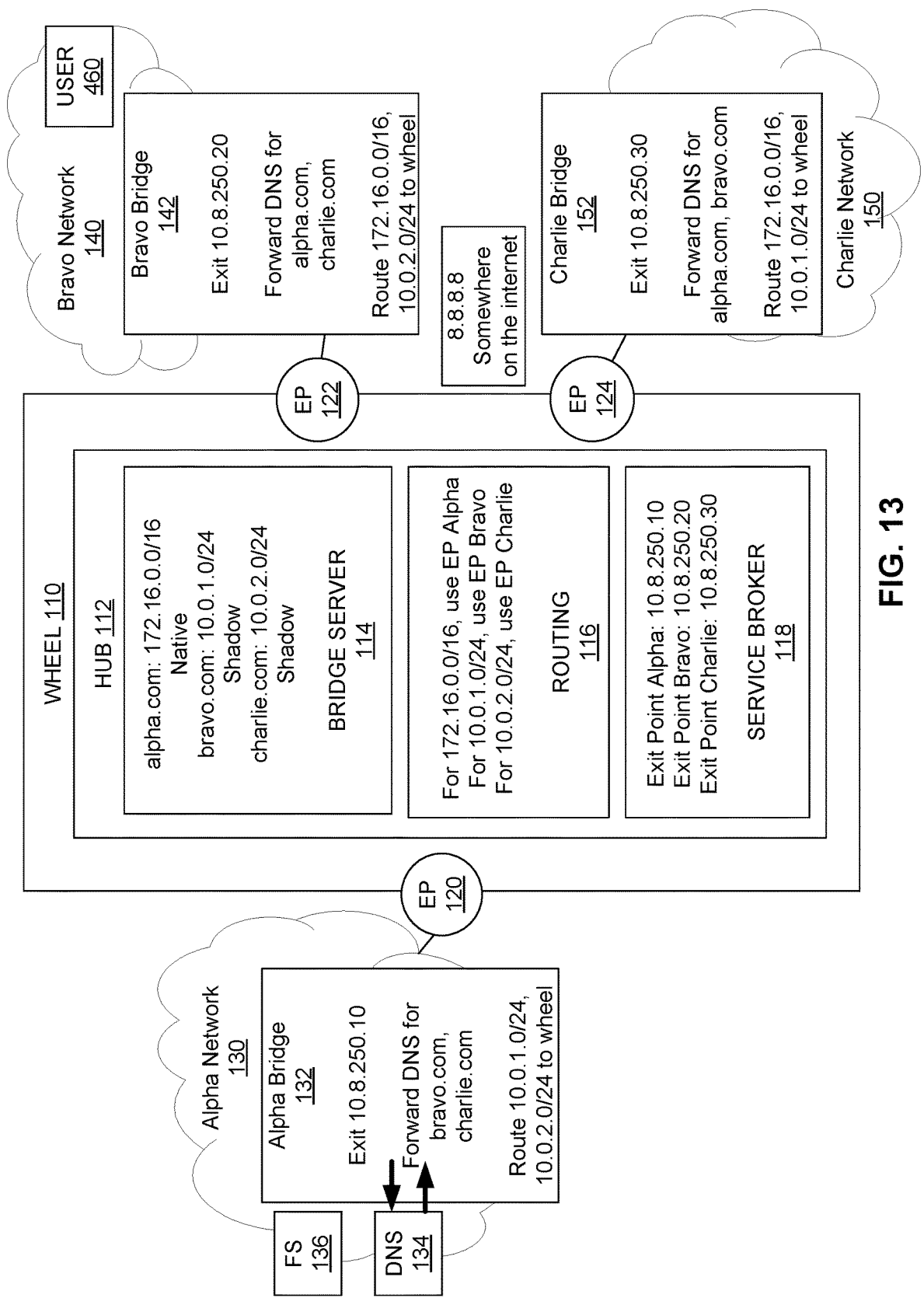
FIG. 13 depicts a local DNS server responding with the actual IP address of the host in the network with native IP addresses.
Figure 14:
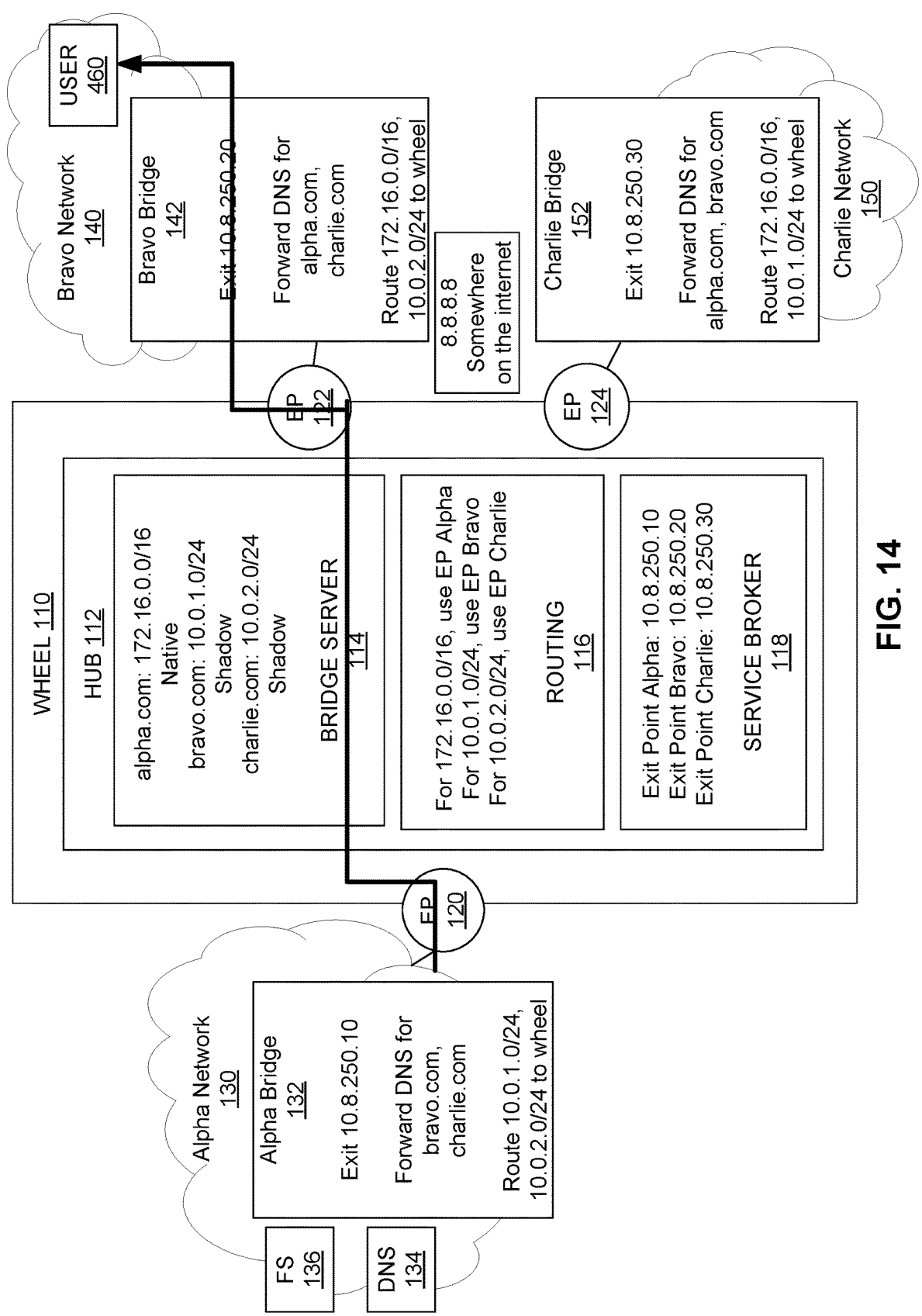
FIG. 14 depicts the receiving bridge device sending a response to the DNS request back to the initiating bridge device.

As depicted in FIG. 12, the DNS request is routed to the wheel 110 and directed to the Alpha bridge 132. Because the Alpha bridge 132 is in native mode, it applies DNAT to the DNS request to the internal Alpha DNS server 134. The Alpha DNS server 134 responds with the actual IP address of filestore.alpha.com, which is 172.16.10.200, as depicted in FIG. 13. The Alpha bridge 132 sends the response back to the initiating bridge device, i.e., the Bravo bridge 142, as depicted in FIG. 14. The DNS response reaches the computer of the user 460 on the Bravo network 130.

Figure 15:
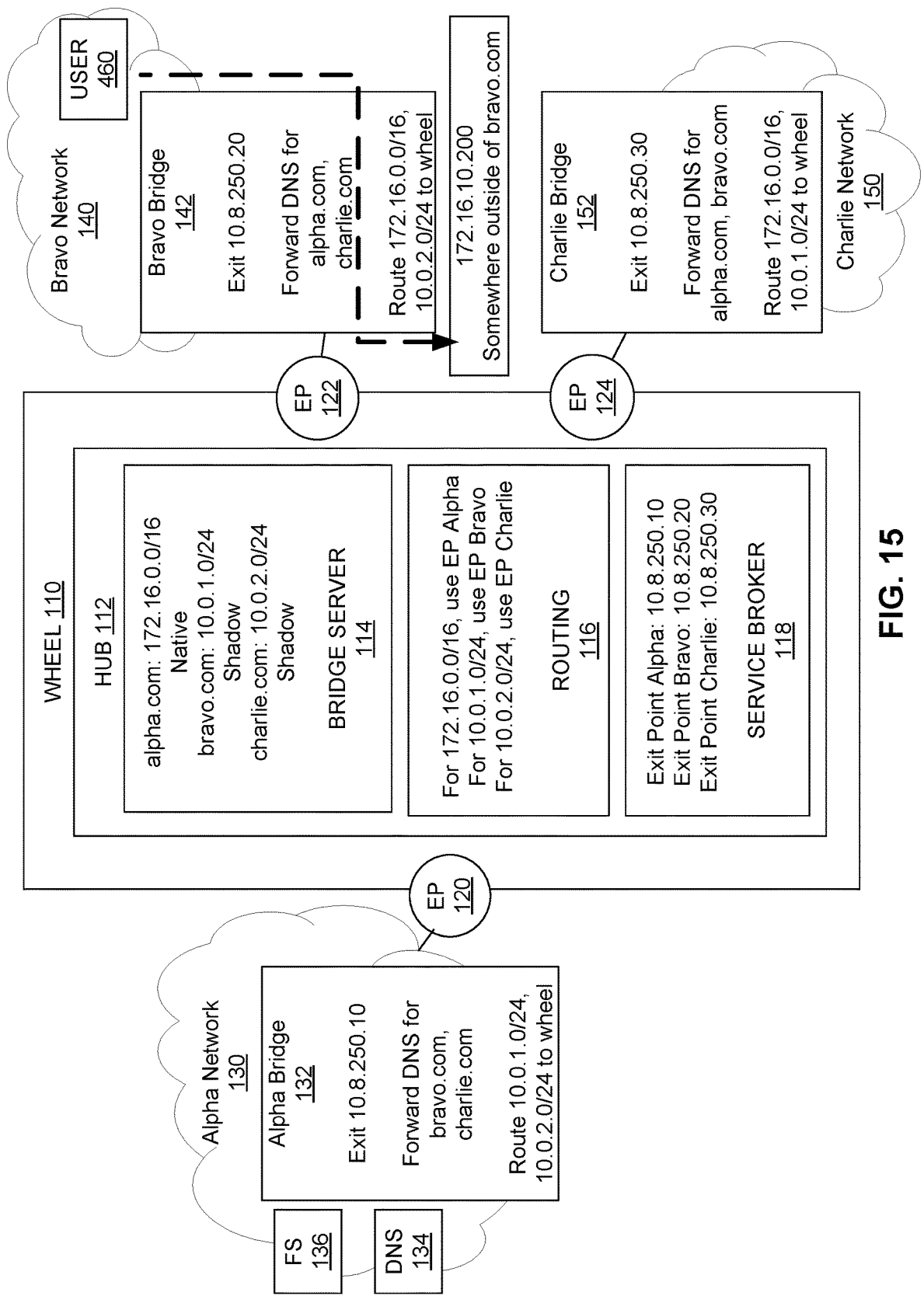
FIG. 15 depicts a computer of a user initiating a network connection to the host in the network with native IP addresses.

After receiving a response to the DNS request, the computer of the user 460 initiating a network connection to 172.16.10.200, as shown in FIG. 15. Because that IP address is not local to the Bravo network 140, traffic is sent to the default router, such that it traverses the Bravo bridge 142.

Figure 16:
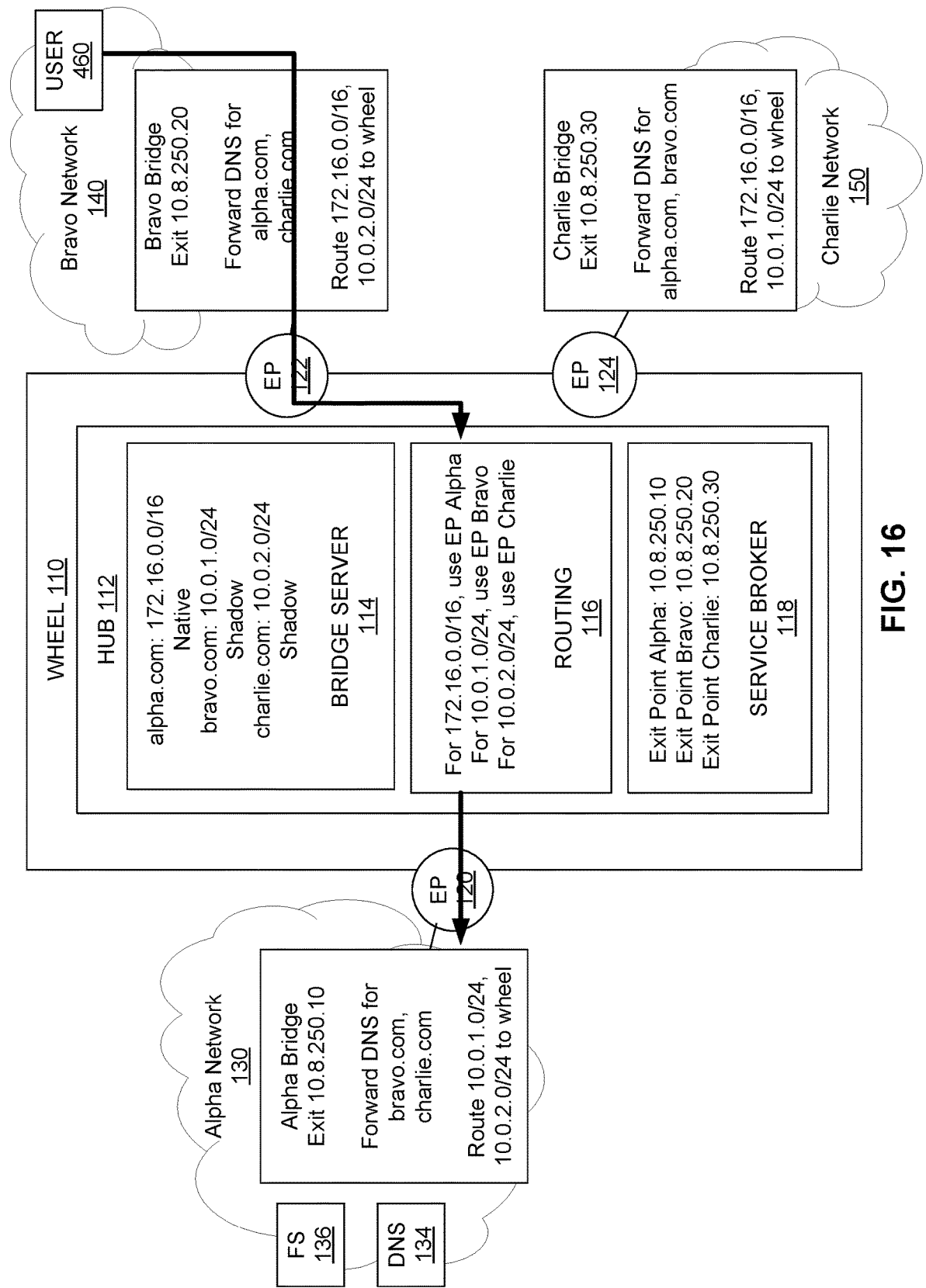
FIG. 16 depicts how the initiating bridge device and the hub route the traffic from the user to the host in the network with native IP addresses.

The Bravo bridge 142 has routing rules in place that direct all 172.16.0.0/16 traffic to use the VPN to reach the hub 112, as shown in FIG. 16. The hub 112 has routing rules that provide that all 172.16.0.0/16 traffic is claimed by the Alpha bridge 132 at 10.8.250.10, so the hub 112 routes the connection to that the Alpha bridge 132. The Alpha bridge 132 is in native mode, so it forwards the connection to that server unimpeded. Thus, the user 460 is able to interact with the filestore.alpha.com server.

Figure 17:
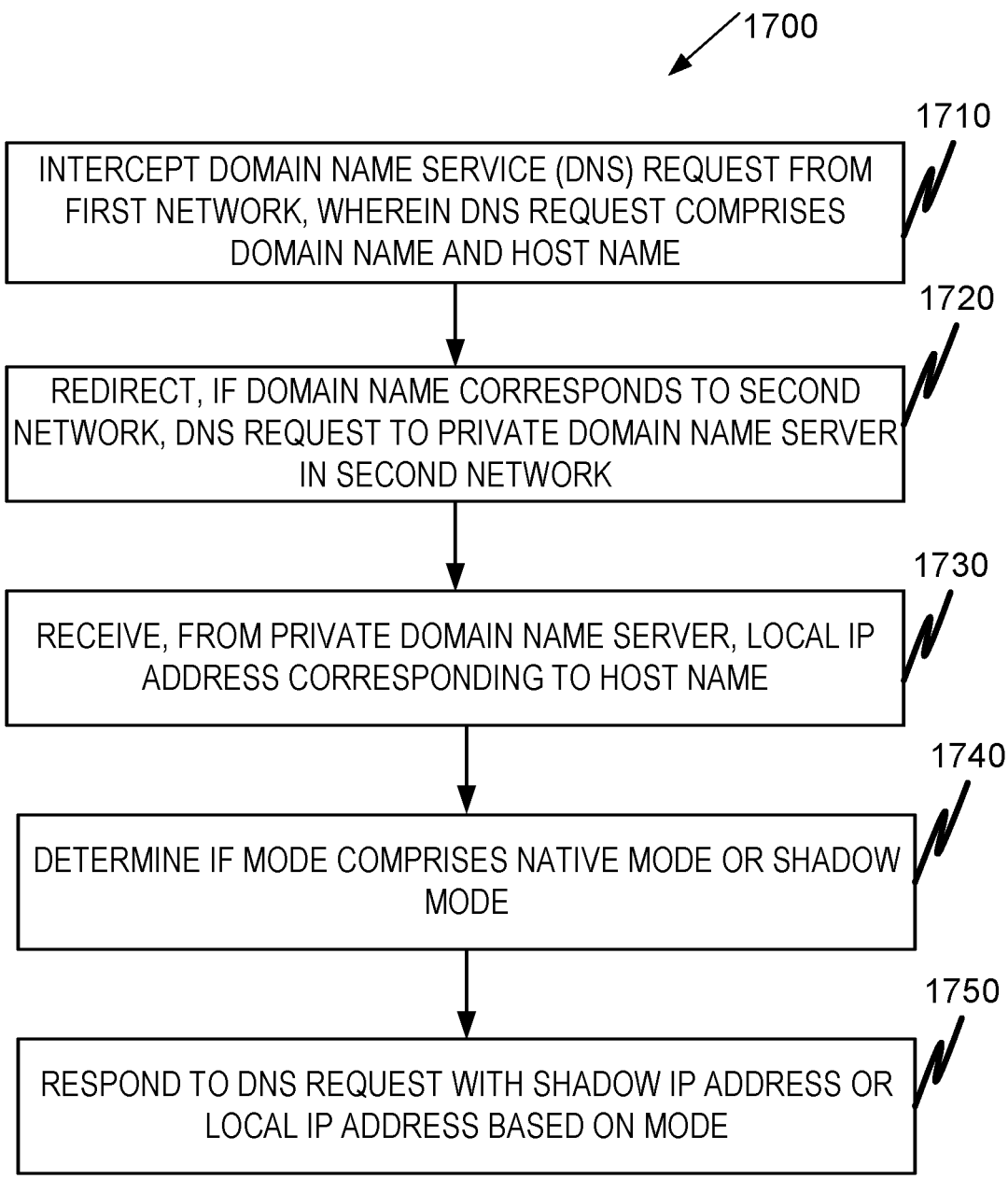
FIG. 17 is a flow diagram depicting a method for facilitating communication between multiple private networks.

FIG. 17 is a flow diagram 1700 depicting a method for facilitating communication between multiple private networks. At 1710, a domain name service (DNS) request is intercepted from a first network. The DNS request comprises a domain name and a host name. If the domain name corresponds to a second network, the DNS request is redirected to a private domain name server in the second network at 1720. At 1730, a local IP address corresponding to the host name is received from the private domain name server. If a mode comprises native mode or shadow mode is determined at 1740. At 1750, the DNS request is responded to with the shadow IP address or the local IP address based on the mode.

Figure 18:
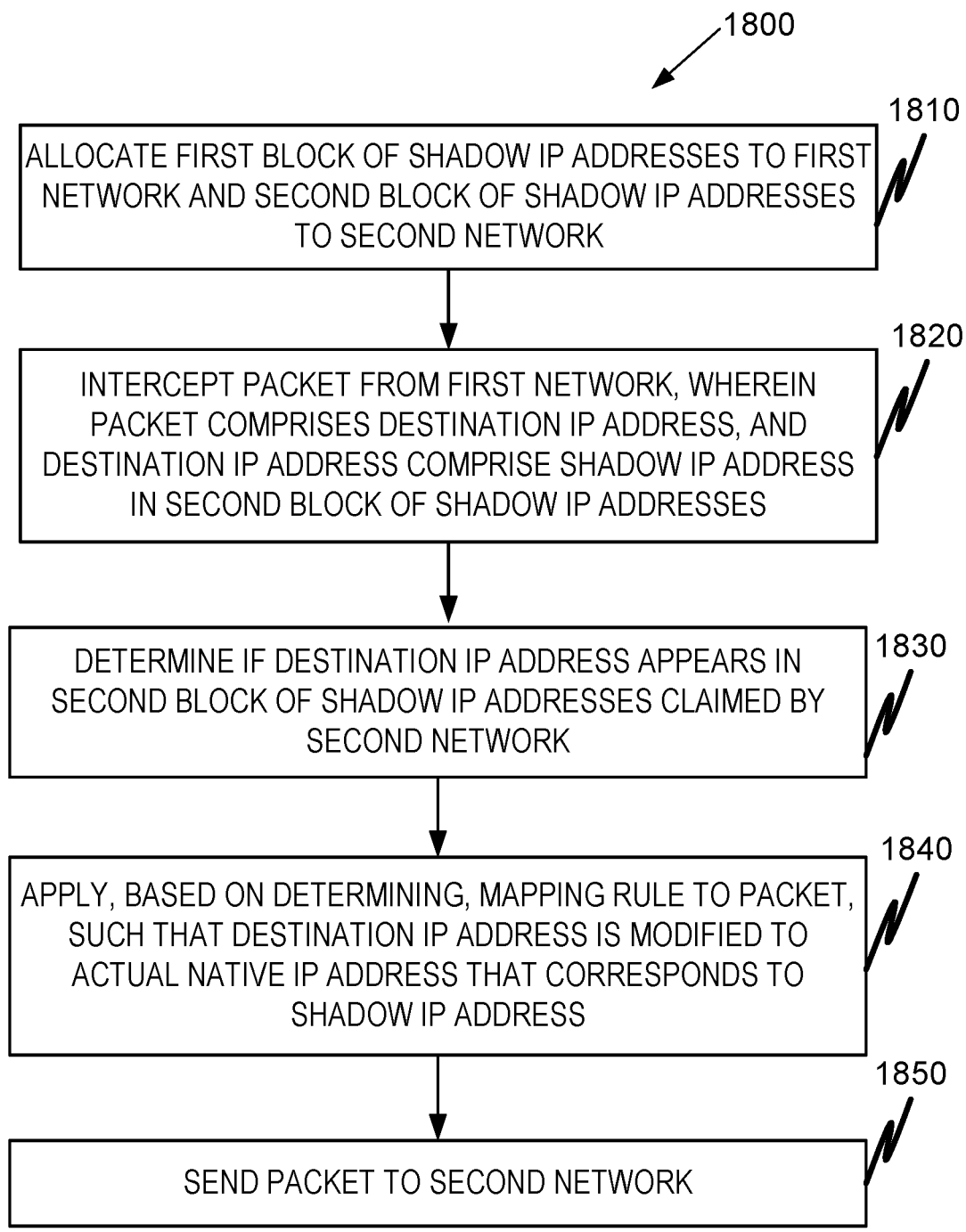
FIG. 18 is a flow diagram depicting a method for facilitating communication between multiple private networks with conflicting IP addresses.

FIG. 18 is a flow diagram 1800 depicting a method for facilitating communication between multiple private networks with conflicting IP addresses. At 1810, a first block of shadow IP addresses is allocated to a first network and a second block of shadow IP addresses is allocated to a second network. A packet is intercepted from a first network at 1820. The packet comprises a destination IP address, and the destination IP address comprises a shadow IP address in the second block of shadow IP addresses. At 1830, whether the destination IP address appears in the second block of shadow IP addresses claimed by a second network is determined. Based on the determining, a mapping rule is applied to the packet, such that the destination IP address is modified to an actual native IP address that corresponds to the shadow IP address at 1840. At 1850, the packet is sent to the second network.

Examples have been used to describe the invention herein, and the scope of the invention may include other examples.

It is claimed:

1. A system for facilitating communication between multiple private networks with conflicting internet protocol (IP) addresses, the system comprising:
   a first bridge device configured to be connected to a first private network and to:
      receive a packet from a first host in the first private network, the packet comprising a destination address corresponding to a second host in a second private network;
      route the packet to a virtual computing device when the destination address is in a block of shadow IP addresses corresponding to at least the second host;
   a second bridge device configured to be connected to the second private network and to:
      receive the packet from the virtual computing device;
      translate the destination address to a corresponding native IP address; and
      send the packet to the second host with the corresponding native IP address.

2. The system of claim 1, wherein the virtual computing device is configured to:
   allocate a block of shadow IP addresses for a block of native IP addresses that correspond to at least the first host, and wherein the block of shadow IP addresses corresponding to at least the second host are for a second block of native IP addresses that correspond to at least the second host, wherein the block of native IP addresses corresponding to at least the first host conflict with the block of native IP addresses corresponding to at least the second host.

3. The system of claim 2, wherein the first bridge device is further configured to:
  establish a virtual private network (VPN) connection with the virtual computing device; and
  provide configuration settings to the virtual computing device, the configuration settings comprising a first domain name, the block of native IP addresses corresponding to at least the first host, and a mode indicating native or shadow.

4. The system of claim 2, further comprising:
  a third bridge device connected to a third private network, the third bridge device configured to use a block of native IP addresses that correspond to at least a third host in the third private network, wherein the native IP addresses of the block of native IP addresses corresponding to at least the third host do not conflict with any of the blocks of native and shadow IP addresses corresponding to at least the first host, and any of the blocks of native and shadow IP addresses corresponding to at least the second host.

5. The system of claim 2, wherein the first bridge device is further configured to:
  present itself as an exit point with a corresponding IP address to the virtual computing device.

6. The system of claim 5, the virtual computing device further configured to:
  execute routing commands that direct traffic to the first bridge device based on the corresponding IP address of the exit point.

7. The system of claim 1, wherein the second bridge device is further configured to apply Destination Network Address Translation (DNAT) or Network Mapping (NETMAP) to the packet.

8. The system of claim 1, the virtual computing device further configured to:
  store a first domain name of the first private network and a second domain name of the second private network in a database table of connected domains.

9. The system of claim 1, the first bridge device further configured to:
  periodically request a list of connected domains, wherein the first bridge device uses the list of connected domains to determine if the packet is destined for a domain in the list of connected domains.

10. The system of claim 9, wherein the packet corresponds to a DNS request, wherein the DNS request is intercepted by the first bridge device, wherein the first bridge device does not forward the DNS request to a default DNS server on the public internet, and wherein the first bridge device forwards the DNS request to the virtual computing device based on the list of connected domains.

11. The system of claim 1:
  wherein the first bridge device is further configured to route the packet to a second virtual computing device when the destination address conflicts with a first native address corresponding to the first private network; and
  wherein a bridge server is configured to associate the first native address with a first unique address, such that the first unique address is not native to the second private network.

12. The system of claim 1, wherein the first bridge device is further configured with a first domain name.

13. The system of claim 12, wherein the bridge server is further configured to associate the first domain name with the first unique address, wherein the first domain name corresponds to the first native address.

14. The system of claim 12, wherein the bridge server is further configured to associate the first domain name with the first native address when the destination address does not conflict with the first native address.

15. The system of claim 1, wherein the first bridge device is further configured to connect to an on-demand network and receive entry point and access tokens from a network implementation engine, such that the first bridge device's bridging can be moved to a new wheel.

16. A method for facilitating communication between multiple private networks with conflicting internet protocol (IP) addresses, the method comprising:
  intercepting a packet from a first network, wherein the packet comprises a destination IP address, and the destination IP address comprises a shadow IP address in a block of shadow IP addresses claimed by a second network;
  determining if the destination IP address appears in the block of shadow IP addresses;
  applying, based on the determining, a mapping rule to the packet, such that the destination IP address is modified to an actual native IP address that corresponds to the shadow IP address.

17. The method of claim 16, wherein the applying the mapping rule comprises Destination Network Address Translation (DNAT) or Network Mapping (NETMAP).

18. The method of claim 16, further comprising:
  maintaining a list of connected domains and corresponding IP address blocks for each of the connected domains.

19. The method of claim 16, further comprising:
  executing routing commands to direct traffic destined for an IP address in the block of shadow IP addresses to be routed across a VPN connection with an on-demand network environment.

* * * * *